(12) United States Patent
Pertsel et al.

(10) Patent No.: US 7,546,026 B2
(45) Date of Patent: Jun. 9, 2009

(54) CAMERA EXPOSURE OPTIMIZATION TECHNIQUES THAT TAKE CAMERA AND SCENE MOTION INTO ACCOUNT

(75) Inventors: Shimon Pertsel, Sunnyvale, CA (US); Eli Pozniansky, Santa Clara, CA (US); Ohad Meitav, Cupertino, CA (US)

(73) Assignee: Zoran Corporation, Sunnyvale, CA (US)

( * ) Notice: Subject to any disclaimer, the term of this patent is extended or adjusted under 35 U.S.C. 154(b) by 396 days.

(21) Appl. No.: 11/258,975

(22) Filed: Oct. 25, 2005

(65) Prior Publication Data

US 2007/0092244 A1    Apr. 26, 2007

(51) Int. Cl.
G03B 17/00    (2006.01)

(52) U.S. Cl. ...................... 396/52; 396/153; 348/208.14

(58) Field of Classification Search .................. 396/153, 396/49, 213, 52–55; 348/255, 208.99, 208.1, 348/208.4, 208.5, 208.6, 208.14, 221.1

See application file for complete search history.

(56) References Cited

U.S. PATENT DOCUMENTS

| | | | |
|---|---|---|---|
| 3,828,122 A | | 8/1974 | McPhee et al. |
| 4,218,119 A | * | 8/1980 | Schickedanz ............... 396/100 |
| 5,043,816 A | | 8/1991 | Nakano et al. |
| 5,220,375 A | | 6/1993 | Ishida et al. |
| 5,223,935 A | | 6/1993 | Tsuji et al. |
| 5,255,044 A | * | 10/1993 | Ishiguro ..................... 396/95 |
| 5,490,225 A | | 2/1996 | Kumagai |
| 5,742,340 A | * | 4/1998 | Alves ......................... 348/255 |
| 5,905,848 A | | 5/1999 | Yano et al. |
| 5,999,746 A | * | 12/1999 | Kitagawa ..................... 396/52 |
| 6,072,525 A | * | 6/2000 | Kaneda .................. 348/208.15 |
| 6,173,121 B1 | * | 1/2001 | Tomita et al. ................. 396/52 |
| 6,301,440 B1 | | 10/2001 | Bolle et al. |
| 6,532,264 B1 | | 3/2003 | Kahn |
| 6,900,846 B2 | | 5/2005 | Lee et al. |
| 6,903,764 B2 | | 6/2005 | Kusaka |
| 6,914,624 B1 | | 7/2005 | Esquibel et al. |
| 7,030,911 B1 | | 4/2006 | Kubo |
| 2002/0039137 A1 | | 4/2002 | Harper et al. |
| 2003/0095189 A1 | | 5/2003 | Liu et al. |
| 2003/0174772 A1 | | 9/2003 | Voronov et al. |
| 2004/0130628 A1 | | 7/2004 | Stavely |
| 2004/0160525 A1 | | 8/2004 | Kingetsu et al. |
| 2004/0169768 A1 | | 9/2004 | Lee et al. |

(Continued)

FOREIGN PATENT DOCUMENTS

JP    5-34757 A    2/1993

(Continued)

Primary Examiner—Christopher E Mahoney
Assistant Examiner—Autumn Parker
(74) Attorney, Agent, or Firm—Darby & Darby PC; John W. Branch

(57) ABSTRACT

Quantities of motion between images of an electronic camera are calculated and used to adjust the exposure time and one or more other exposure parameters used to capture an image in order to improve the quality of the image. Motion blur caused by movement of the camera or by movement of an object within the scene being photographed is reduced by selecting appropriate exposure parameters. Further, when there is little or no motion detected, the exposure parameters may be selected to improve the depth of field and reduce the noise in the captured image.

20 Claims, 5 Drawing Sheets

| U.S. PATENT DOCUMENTS | | | | JP | 08-320511 A | 12/1996 |
|---|---|---|---|---|---|---|
| 2004/0239771 A1 | 12/2004 | Habe | | JP | 8-327917 | 12/1996 |
| 2004/0252765 A1 | 12/2004 | Hosoda | | JP | 10174027 A | 6/1998 |
| 2005/0128343 A1* | 6/2005 | Murata et al. | 348/362 | JP | 11-088810 A | 3/1999 |
| 2006/0017814 A1 | 1/2006 | Pinto et al. | | JP | 2005109824 A | 4/2005 |

FOREIGN PATENT DOCUMENTS

JP  6-308588 A  11/1994

\* cited by examiner (Global Motion)

(Total Motion of Image Blocks with Local Motion)

(Local Motion)

(Total Motion)

$$|M_T| = k\,|M_G| + \frac{1}{\sum_{\text{all}_{i,j}} W_{ij}} \sum_{\text{all}_{i,j}} W_{ij}\,|M_{L_{ij}}|$$

CAMERA EXPOSURE OPTIMIZATION TECHNIQUES THAT TAKE CAMERA AND SCENE MOTION INTO ACCOUNT

BACKGROUND

This application relates to automatic exposure control of digital cameras and other electronic video acquisition devices, and, more specifically, to the calculation and utilization therein of optimal exposure parameters to capture data of still or a sequential series of images. All patents, patent applications, articles, other publications and things referenced herein are hereby incorporated herein by this reference in their entirety for all purposes.

Electronic cameras image scenes onto a two-dimensional sensor such as a charge-coupled-device (CCD), a complementary metal-on-silicon (CMOS) device or other type of light sensor. These devices include a large number of photodetectors (typically two, three, four or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate a serial stream of data representative of the intensity of radiation striking one sensor element after another as they are scanned. Color data are most commonly obtained by using photodetectors that are sensitive to each of distinct color components (such as red, green and blue), alternately distributed across the sensor.

A popular form of such an electronic camera is a small hand-held digital camera that records data of a large number of picture frames either as still photograph "snapshots" or as sequences of frames forming a moving picture. A significant amount of image processing is typically performed on the data of each frame within the camera before storing on a removable non-volatile memory such as a magnetic tape cartridge or a flash memory card. The processed data are typically displayed as a reduced resolution image on a liquid crystal display (LCD) device on the outside of the camera. The processed data are also typically compressed before storage in the non-volatile memory in order to reduce the amount of storage capacity that is taken by the data for each picture frame.

The data acquired by the image sensor are typically processed to compensate for imperfections of the camera and to generally improve the quality of the image obtainable from the data. The correction for any defective pixel photodetector elements of the sensor is one processing function. Another is white balance correction wherein the relative magnitudes of different pixels of the primary colors are set to represent white. This processing also includes de-mosaicing the individual pixel data to superimpose data from spatially separate monochromatic pixel detectors of the sensor to render superimposed multi-colored pixels in the image data. This de-mosaicing then makes it desirable to process the data to enhance and smooth edges of the image. Compensation of the image data for noise and variations of the camera optical system across the image and for variations among the sensor photodetectors is also typically performed within the camera. Other processing typically includes one or more of gamma correction, contrast stretching, chrominance filtering and the like.

Electronic cameras also nearly always include an automatic exposure control capability that sets the exposure time, size of its aperture opening and analog electronic gain of the sensor to result in the luminescence of the image or succession of images being at a certain level based upon calibrations for the sensor being used and user preferences. These exposure parameters are calculated in advance of the picture being taken, and then used to control the camera during acquisition of the image data. For a scene with a particular level of illumination, a decrease in the exposure time is made up by increasing the size of the aperture or the gain of the sensor, or both, in order to obtain the data within a certain luminescence range. An increased aperture results in an image with a reduced depth of field and increased optical blur, and increasing the gain causes the noise within the image to increase. Conversely, when the exposure time can be increased, such as when the scene is brightly lighted, the aperture and/or gain are reduced, which results in the image having a greater depth of field and/or reduced noise. In addition to analog gain being adjusted, or in place of it, the digital gain of an image is often adjusted after the data have been captured.

It is often difficult for the user to hold a camera by hand during an exposure without imparting some degree of shake or jitter, particularly when the camera is very small and light. As a result, the captured image may have a degree of overall motion blur that depends on the exposure time, the longer the time the more motion blur in the image. In addition, long exposures of a scene that is totally or partially moving can also result in motion blur in the captured image. An object moving fast across the scene, for example, may appear blurred in the image. The automatic exposure processing of existing cameras does not take into account motion of the camera or motion within the scene when calculating the exposure parameters to be used to capture an image of the scene.

SUMMARY

According to the present invention, motion is detected and the exposure parameters are set, in advance of capturing data of the image, to levels that enhance the captured image based on the amount of motion of the scene relative to the image frame within the camera. Blur of the image caused by either camera shake or local motion within the scene, or both, can be minimized or even prevented by adjusting the exposure parameters. Conversely, in cases where little or no motion is detected prior to capturing the image data, the exposure parameters may be set to optimize other aspects of the image, such as increasing the exposure time in order to allow the depth of field to be increased and/or the level of noise to be reduced.

Motion is preferably measured by calculating motion quantities from data of two or more images prior to capturing data of the final image (pre-capture images). Motion quantities that define the amount of motion of the scene image relative to the camera, including motion within the scene, are preferably calculated. Such relative motion quantities may include direction, thereby being motion vectors, or may just express the magnitude of the motion. By this technique, local motion vectors are individually calculated for distinct blocks of pixels within the image, which then allows motion within the scene to be taken into account when calculating the exposure parameters. Global motion vectors, such as caused by camera shake, can also be calculated from data of the two or more pre-capture images. Although the presence of motion blur can be detected from data of a single image, the calculation of motion vectors from two or more pre-capture images is more precise and leads to better control of the exposure parameters used to subsequently capture the image. Use of a mechanical motion sensor, which is included in some cameras, can only provide an indication of any global motion, not individual motion of objects or portions within the scene being photographed.

The results of the image motion calculations may also be used to estimate future motion so that a time to capture data of the image may be chosen where the absolute velocity of motion is at least less than at other times and possibly minimal. Particularly in the case of camera shake, where the motion often has some periodicity to it that can be forecasted, the picture can be taken at a time when the global motion is zero or near zero. The velocity of a portion of the scene can also be forecasted in the same way and a time chosen to take the picture when the local motion blur is minimized. When doing this forecasting, the exposure parameters are preferably calculated from the motion quantities that are expected to exist at the time scheduled for capturing the image.

In a preferred implementation, preliminary exposure parameters are calculated in the same manner as in existing cameras, without regard to any motion of the camera or portions of the scene image. If these preliminary parameters are at levels where their adjustment is not likely to improve the quality of the image, then the image is captured with them and the results of motion calculations are not used. An example where this can occur is with a brightly lighted scene, where the preliminary exposure time is nearly as short, the aperture nearly as small and the gain nearly as low as the camera allows. In such a case, the exposure time can neither be significantly shortened to limit any motion blur nor increased to significantly improve depth of field or reduce noise since the aperture and gain level are nearly as small as possible. But when this is not the case, the preliminary exposure parameters are adjusted on the basis of the image motion calculations to improve the quality of the captured image.

Additional aspects, advantages and features of the present invention are included in the following description of exemplary examples thereof, which description should be taken in conjunction with the accompanying drawings.

DESCRIPTION OF EXEMPLARY
EMBODIMENTS

Video data acquired by a digital camera are typically processed to compensate for imperfections of the camera and to generally improve the quality of the image obtainable from the data. The correction for any defective pixel photodetector elements of the sensor is one processing function that may be performed. Another is white balance correction wherein the relative magnitudes of different pixels of the primary colors are set to represent white. This processing may also include de-mosaicing the individual pixel data to superimpose data from spatially separate monochromatic pixel detectors of the sensor to render superimposed multi-colored pixels in the image data. This de-mosaicing then makes it desirable to process the data to enhance and smooth edges of the image. Compensation of the image data for noise and variations of the camera optical system across the image and for variations among the sensor photodetectors may also be performed. Other processing typically includes one or more of gamma correction, contrast stretching, chrominance filtering and the like. The processed data are then usually compressed by use of a commercially available algorithm before storage in a non-volatile medium.

Rather than post-processing the acquired video data by taking image motion into account, however, the present invention monitors images of the scene in advance of taking the picture and then sets the exposure parameters to values that enhance the resulting image based on the amount of motion present. The processing calculates at least an optimal exposure time that can be used along with other exposure parameters to acquire data of an image. The amount of camera jitter is preferably determined by comparing data of two or more pre-capture images, typically having lower resolution than the final acquired image, rather than using a gyroscope or other mechanical camera motion detector, although such a motion detector may alternatively be used. The pre-capture images may also be used to determine an amount of motion of objects within the scene being photographed and the exposure time and level can be calculated to enhance the image based on the amount of such motion.

Electronic Camera Example

Figure 1:
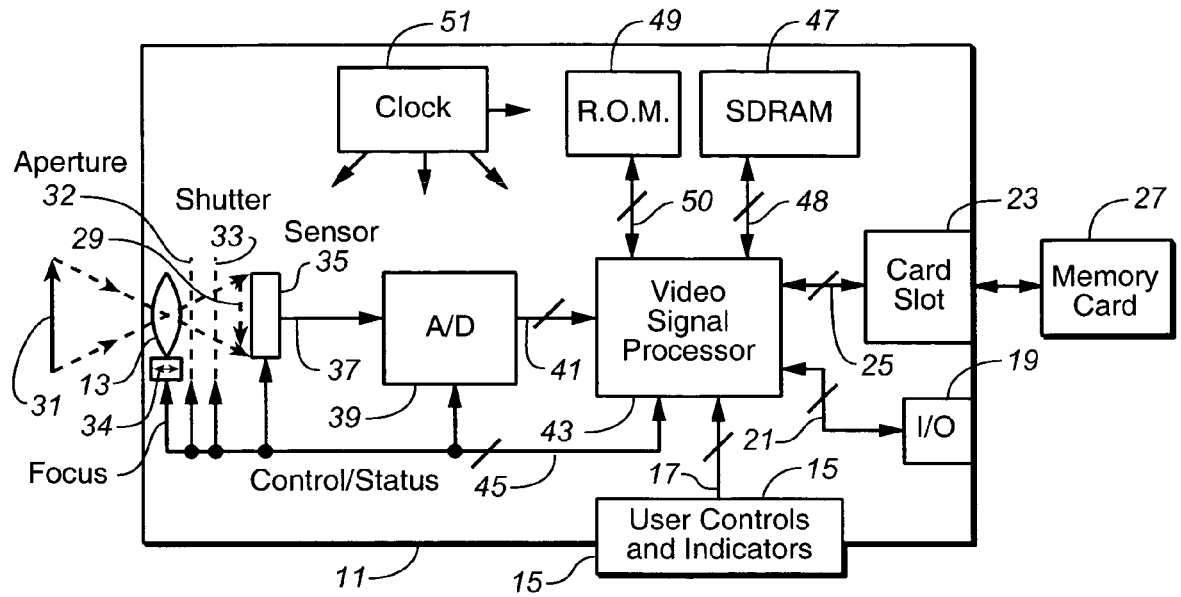
FIG. 1 illustrates a camera or other video acquisition device in which the exposure control techniques of the present invention may be implemented.

In FIG. 1, an example of a camera in which the present invention may be implemented is schematically shown, which may be a still camera or a video camera. It includes a case 11, an imaging optical system 13, user controls and indicators 15 that generate and receive control signals 17, a video input-output receptacle 19 with internal electrical connections 21, and a card slot 23, with internal electrical connections 25. A non-volatile memory card 27 is removably inserted into the card slot 23. Data of images captured by the camera may be stored on the memory card 27 or in an internal non-volatile memory (not shown). Image data may also be outputted to another video device through the receptacle 19. The memory card 27 can be a commercially available semiconductor flash memory, small removable rotating magnetic disk or other non-volatile memory to which video data can be written by the camera.

The optical system 13 can be a single lens, as shown, but will normally be a set of lenses. An image 29 of a scene 31 is formed in visible optical radiation through an aperture 32 and a shutter 33 onto a two-dimensional surface of an image sensor 35. A motive element 34 moves one or more elements of the optical system 13 to focus the image 29 on the sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern, where the rows of photo-detectors are scanned one at a time from left to right, beginning at the top row, to generate a frame of video data from which the image 29 may be reconstructed. The analog signal 37 is applied to an analog-to-digital converter circuit chip 39 that generates digital data in circuits 41 of the image 29. Typically, the signal in circuits 41 is a sequence of individual blocks of digital data representing the intensity of light striking the individual photo-detectors of the sensor 35.

The photo-detectors of the sensor 35 typically detect the intensity of the image pixel striking them in one of two or more individual color components. Early sensors detect only two separate colors of the image. Detection of three primary colors, such as red, green and blue (RGB) components, is common. Currently, image sensors that detect more than three color components are becoming available.

Processing of the video data in circuits 41 and control of the camera operation are provided, in this embodiment, by a single integrated circuit chip 43 (which may also include the analog-to-digital converter instead of using the separate circuit chip 39). These functions may be implemented by several integrated circuit chips connected together but a single chip is preferred. In addition to being connected with the circuits 17, 21, 25 and 41, the circuit chip 43 is connected to control and status lines 45. The lines 45 are, in turn, connected with the aperture 32, shutter 33, focus actuator 34, sensor 29, analog-to-digital converter 39 and other components of the camera to provide synchronous operation of them. Signals in the lines 45 from the processor 43 drive the focus actuator 34 and set the size of the opening of the aperture 32, as well as operate the shutter 33. The gain of the analog signal path is also set by the processor 43 through the lines 45. This gain typically takes place in the analog-to-digital converter which, in the case of a CCD sensor, is part of the sensor, or in the case of a CMOS sensor, is part of a separate analog-to-digital converter as shown in FIG. 1.

A separate volatile random-access memory circuit chip 47 is also connected to the processor chip 43 through lines 48 for temporary data storage. Also, a separate non-volatile memory chip 49 is connected to the processor chip 43 through lines 50 for storage of the processor program, calibration data and the like. The memory 49 may be flash memory, which is re-programmable, or a memory that is programmable only once, such as a masked programmable read-only-memory (PROM) or an electrically programmable read-only-memory (EPROM). A usual clock circuit 51 is provided within the camera for providing clock signals to the circuit chips and other components. Rather than a separate component, the clock circuit for the system may alternatively be included on the processor chip 43.

Figure 2:
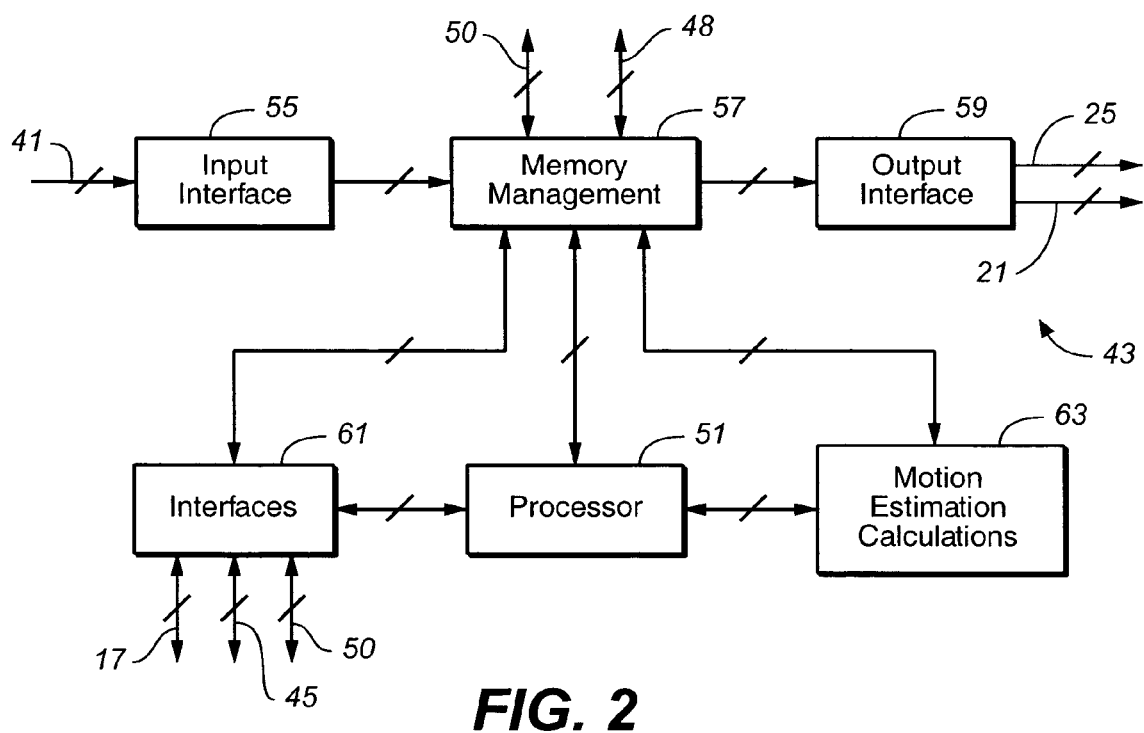
FIG. 2 is a block diagram of some of the functional components of the video signal processor of the device of FIG. 1.

A general block diagram of the processor chip 43, including portions that calculate and estimate motion, is given in FIG. 2. A processor 51, which may be general purpose or dedicated to the tasks herein, performs calculations on the image data and controls operation of the camera, in response to firmware stored in the flash memory 49 (FIG. 1). Digital data of successive image frames are received over lines 41 by an interface circuit 55 through input contacts on the chip 43, and then communicated with other system components by connection through a memory management unit 57. Video data of captured image frames are outputted through an interface circuit 59 to lines 21 (to the input-output receptacle 19 of FIG. 1) and 25 (to the flash memory card slot 23 of FIG. 1) that are connected to output contacts on the chip 43. Interface circuits 61 communicate between the lines 17, 45 and 50 (see FIG. 1) and the processor 51 and memory management unit 57.

Circuits 63 of FIG. 2, also connected with the processor 51 and memory management unit 57, are optionally included to perform at least some of the calculations necessary to estimate motion of the image from data of successive image frames. This is usually more efficient than employing the processor 51 to make the calculations under control of the firmware but the calculations could alternatively be made by the processor.

Setting Exposure Parameters

Figure 3:
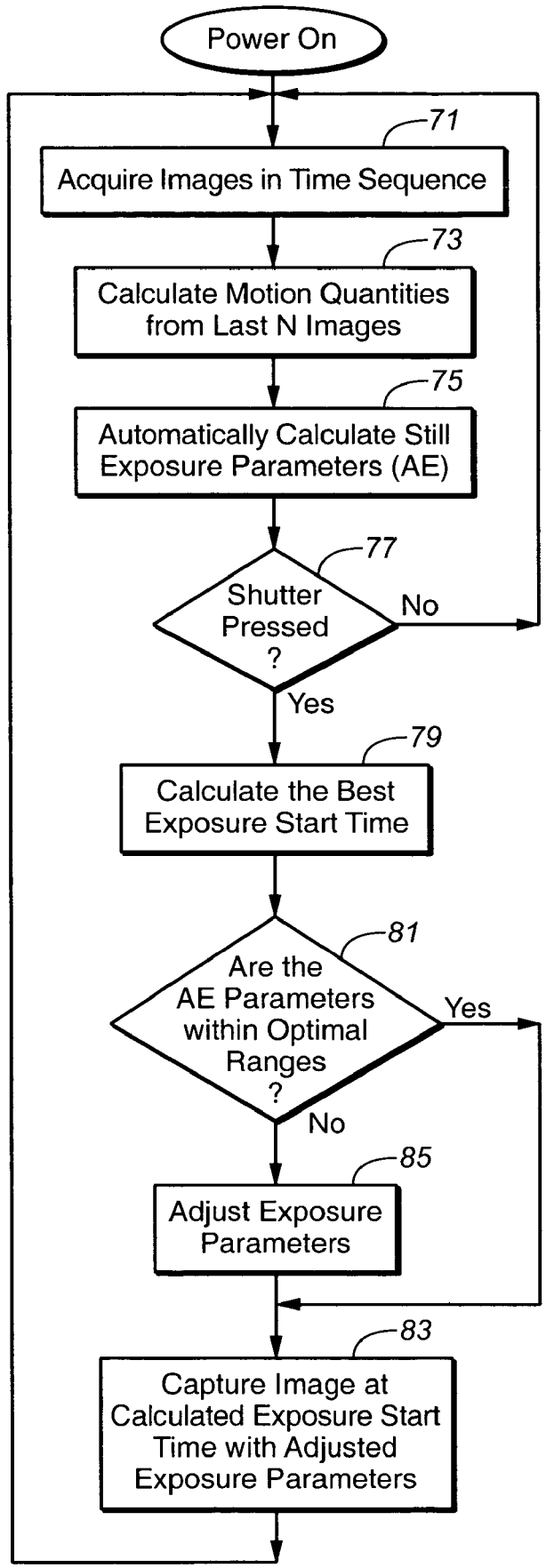
FIG. 3 is a flow chart showing steps of calculating and using exposure parameters according to one specific embodiment of the present invention.

FIG. 3 is a flowchart that illustrates an example of a process implemented within a camera such as illustrated in FIGS. 1 and 2 to calculate exposure parameters for use in acquiring data of an image. Once the camera is turned on by the user, it repetitively acquires data of images, as indicated by a step 71, at many frames per second, which can be as high as 30 or more. In the usual camera, these pre-capture images are displayed in sequence on the camera's LCD display with a reduced resolution, as a preview of an image that the camera would capture when its shutter button is pushed but they need not be displayed. Two other calculation functions 73 and 75 are performed each time data of a new pre-capture image are acquired. This processing is continuous while the camera is being used. When it is detected that the camera user has depressed the shutter button to take a picture, as indicated by a step 77, the quantities and parameters calculated in steps 73 and 75 are ready for use in setting up the camera up to quickly take the picture. Alternatively, however, the calculations 73 and 75 could be made after the step 77 has detected depression of the shutter button.

In the step 73, data of N number of pre-capture images are used to calculate motion quantities for use in setting the exposure parameters, where N equals two or more, and can be five or more. As explained in detail below, any change in motion of the scene image relative to the camera's photosensor is detected and quantified by looking at changes in successive pre-capture images, both globally (movement of the entire image) and locally (local movement within the image). Vectors of motion, velocity and acceleration are preferably calculated from data of N pre-capture images, thereby allowing a prediction to be made of the future location of the scene image, or a portion of it, on the photosensor.

In the step 75, exposure parameters are calculated by existing techniques, without regard to any image motion, in order to maintain the average luminescence across the image within a predefined range. The average luminescence can be measured from a pre-capture image. The time duration of the exposure and one or more other exposure parameters are calculated in this step. The other exposure parameters typically include the size of the aperture opening and gain. However, although these parameters are used directly to set current cameras to take a picture, they are treated in the camera operation shown in FIG. 3 as preliminary, subject to modification by the results of the motion calculations 73.

Once depression of the shutter button is detected by the step 77, the picture could be taken as soon thereafter as possible. However, it is preferred to first look at the motion quantities calculated in the step 73. Taking of the picture may then be postponed for a time until any motion of the image is expected to be minimal, in order to minimize any motion blur in the resulting image. Therefore, in a step 79, the optimum instant to take the picture is estimated from the motion quantities calculated in step 73. This estimate is made by extrapolating the motion quantities calculated from the pre-capture images in the step 73, and then identifying either zero or minimal motion within a set period. It is at that instant that the picture is scheduled to be taken. If, however, a zero or minimal motion point cannot be detected with high precision, due to the complexity of the motion, or if the user has chosen to turn off the delayed capturing option, or if the motion quantities show that there is little or no motion of the image, then the time for taking the picture is not postponed and capture of the image is executed right away.

A next step 81 determines whether the exposure parameters automatically calculated in the step 75 are such that the motion quantities will not cause them to be altered. For example, if the exposure duration (shutter speed) is set by the step 75 to be below a certain threshold, then no further decrease of the exposure time to reduce motion blur should be done. And if the aperture and gain are also set by the step 75 to be smaller than corresponding thresholds, then it is not necessary to consider whether motion in the image is small enough to allow the shutter speed to be increased in order to lower them to improve depth of field or reduce noise. In such a case, which occurs for example, in a very brightly illuminated scene, the processing proceeds to a step 83 where the picture is taken with the exposure parameters set by the step 75. The motion quantities calculated in the step 73 are not used or even referenced. Nor is the calculation of step 79 of the time to take the picture necessary; the picture can be taken right away.

However, in most situations the scene is not so brightly illuminated. Therefore, when the preliminary parameters calculated by the step 75 are not within optimum ranges, they are adjusted by a step 85 in order to optimize them for the amount of motion that was calculated by the step 73. Generally, if that motion is high, the exposure time is reduced, with a corresponding increase in the size of the aperture and/or increase in the gain in order to maintain the same average image signal luminescence. This reduces motion blur, but the depth of field generally will decrease and/or the noise of the image may increase. But this tradeoff will almost always be preferred to acquiring an image with motion blur.

On the other hand, if the calculated motion is low or zero, the exposure time may be increased, with the benefit that the size of the aperture and/or the gain may be decreased. This provides an image with a greater depth of field, less optical blur and less noise. Without having the calculated motion quantities, it would be risky to adjust the preliminary parameters calculated by the step 75 in this way since it could result in increased motion blur in the image when motion is present.

Figure 4:
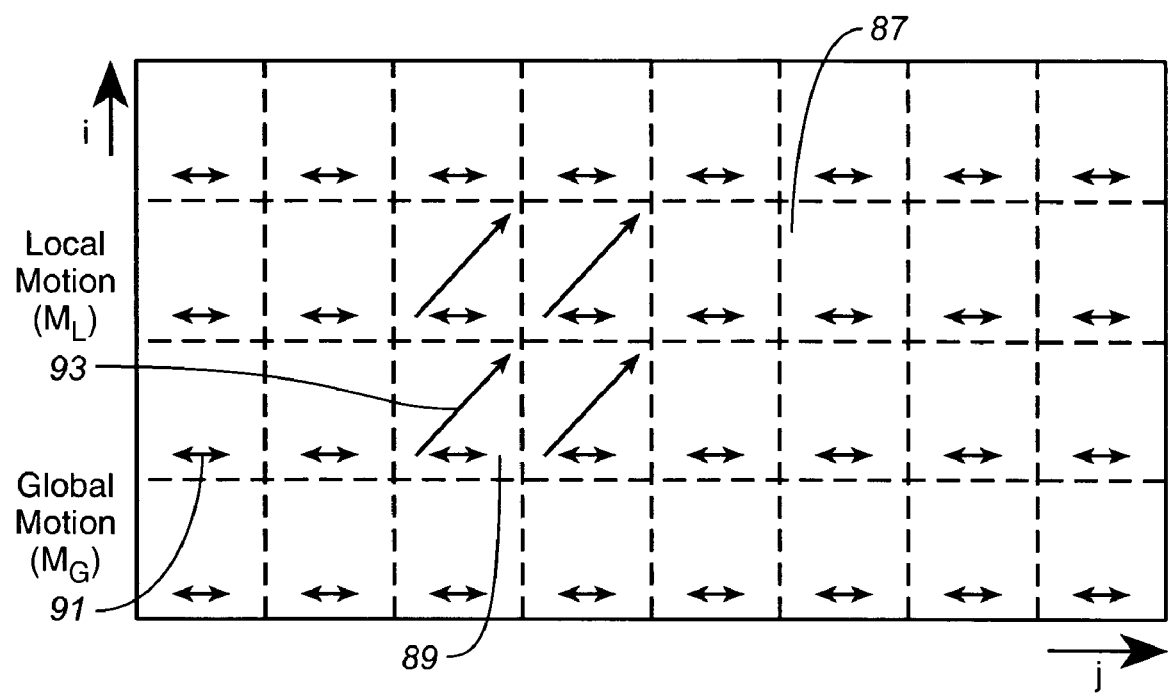
FIG. 4 represents an image frame with exemplary camera and scene motion vectors added to individual blocks of pixels.

FIG. 4 conceptually shows a single image with its pixels grouped into blocks of multiple pixels each, such as blocks 87 (represented by the i, j coordinates 3,6) and 89 (2,3). Motions of the scene being photographed relative to the camera image frame are indicated. An example image is illustrated to have a global motion vector $M_G$ indicated by arrows 91 in each of the blocks of pixels. This motion would result from camera shake, back-and-forth in a horizontal direction. Of course, other camera motion would be illustrated by different patterns. If the motion is up-and-down, for example, the global motion arrows would be shown vertically. If the camera motion follows a circular or elliptical pattern, two other possibilities, the motion would be shown by a circle or ellipse, respectively.

The magnitude and direction of global motion is calculated from data of N pre-capture images, preferably by the circuits 63 (FIG. 2), by detecting and quantifying overall movement between the pre-capture images. An example of a specific technique for calculating global motion is given in U.S. patent application Ser. No. 10/897,186, filed by Pinto et al. on Jul. 21, 2004, now publication number US 2006/0017814 A1. Alternatively, a mechanical motion sensor can be included in the camera for the purpose of providing a signal of the global motion but is not preferred.

In the example of FIG. 4, a portion of the image is shown to have additional local motion vectors $M_L$, in this case for four of the blocks, which are independent of any camera shake or other global motion. This represents motion of that small part of the scene being photographed relative to the rest of the scene and to the person holding the camera. The resulting motion within the image is in the direction of the arrows and with a relative velocity represented by the length of the arrows. Such motion can be from the movement of a person in the scene, vehicle motion, the action of wind on a tree, or from numerous other movements in scenes that are photographed. Algorithms for the calculation of motion within an image of between a sequence of images are known. An example is described in the above-identified United States patent application publication number US 2006/0017814 A1. Motion vectors can be calculated in a manner that is similar to the calculation of motion vectors used by known video compression algorithms, examples being those of the Moving Picture Experts Group, the most recent being MPEG-4.

By one motion calculation technique, vectors of motion, velocity and acceleration are calculated for each of the blocks of pixels of the image. These quantities give the motion of each block and allow its future location, speed and direction to be estimated. If a large object moves across the scene, for instance, then the blocks representing the object have motion vectors that point in the direction of the movement. If the image motion is due to camera shake only, the block motion vectors of all or most of a scene generally point in the same direction. The local motion vectors $M_L$ of this description are these individual block motion vectors after the global motion vector $M_G$ has been subtracted. So the vectors $M_L$ provide an indication of only local motion within the image of the scene. The vectors $M_L$ and $M_G$ are to that extent independent of each other.

Figure 5A:
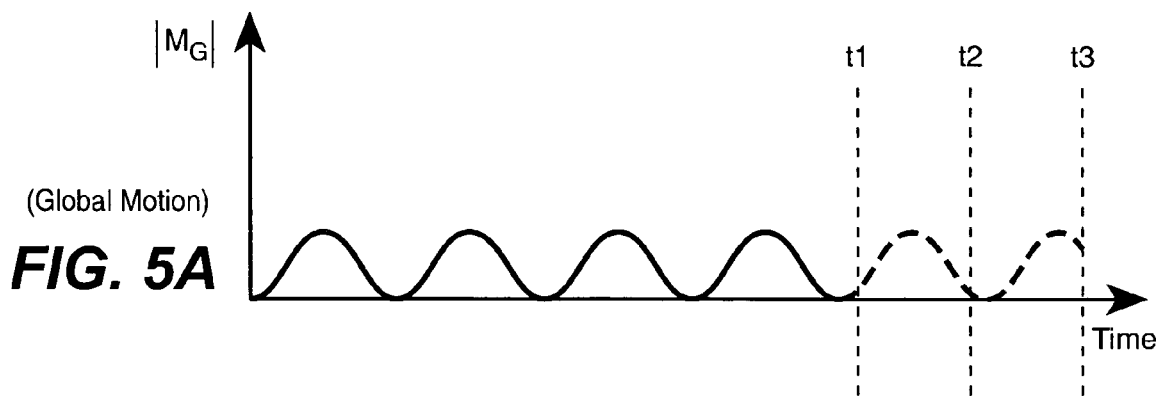
FIGS. 5A-5D represent amounts of motion of the image frame of FIG. 4, in an illustrative example.
Figure 5B:
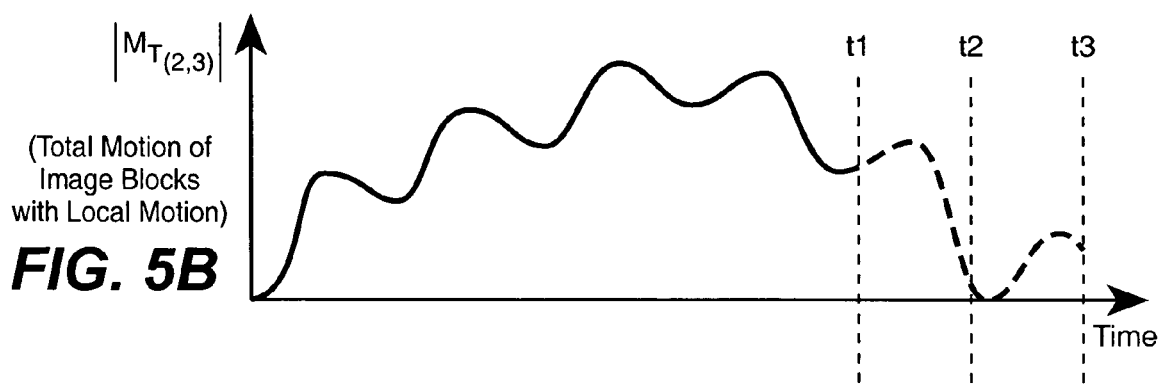
Figure 5C:
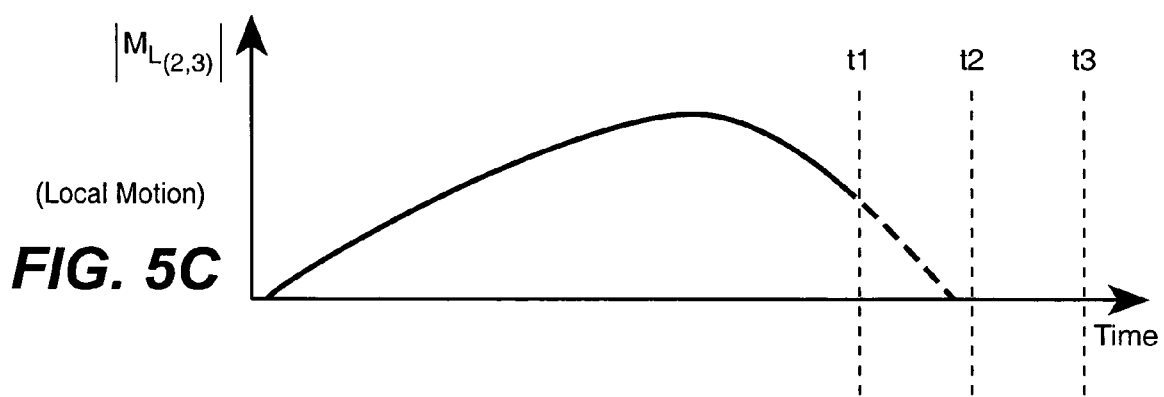

Curves of FIGS. 5A-5D provide an example of absolute values of local and global velocity vectors as a function of time, and combinations of them, in order to further describe the calculations of steps 73 and 79 (FIG. 3). FIG. 5A shows the global motion represented by the arrows 91 of FIG. 4. In this example, a back-and-forth motion of a camera is represented, having a zero speed (absolute velocity) at one extreme of its motion, a zero speed at the other end of its motion, and an increasing-decreasing speed function in between. FIG. 5C shows an example of the magnitude of local motion vector 93 of the pixel block 89 of FIG. 4. For illustrative purposes, this motion is shown to increase from zero to a maximum and then decrease during the pre-capture images. FIG. 5B shows the absolute value of a total motion vector $M_{T(2,3)}$ for only the pixel block 89. This is an arithmetic combination of the magnitudes of the curves of FIGS. 5A and 5C.

Figure 5D:
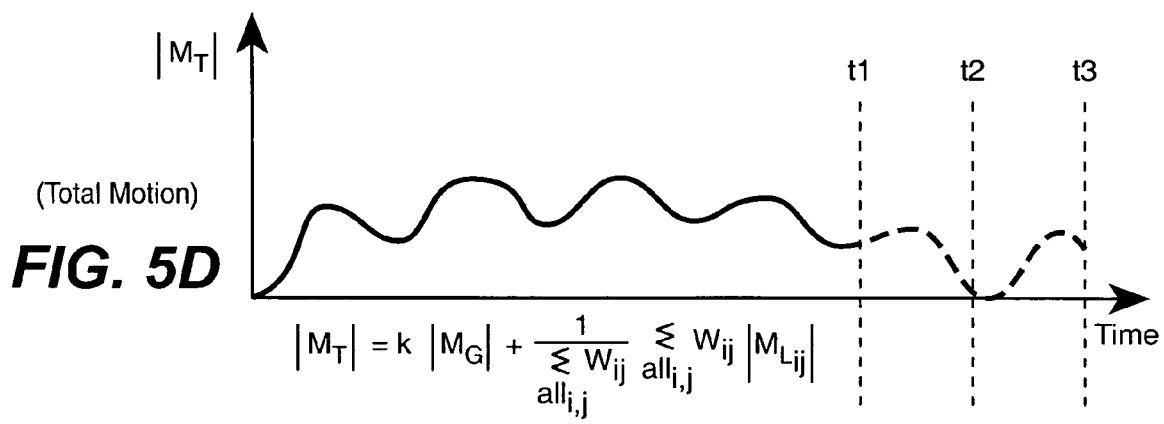

FIG. 5D shows an example of the total motion quantity $M_T$ for the entire image frame. The motion calculations result in one value of $M_T$ for each pre-capture image frame, and this is not a vector. It is the primary quantity used in the steps 79 and 85 (FIG. 3) to determine an exposure time and adjust the exposure parameters. Indeed, the quantities $M_T$ for a number of successive pre-capture images are used when it is desired to estimate a better time for the exposure. For these purposes, it is a combination of the global motion of FIG. 5A and a weighted average of the local motion quantities of the individual pixel blocks within the image. An equation for calculating $M_T$ of an image frame is given in FIG. 5D. The weight W of an individual pixel block (i,j) can be made to depend on its location within the image frame or on its relative luminance with respect to the rest of the image. The weight W may be a function of the distance of the block from the center of the image frame. Therefore, the total motion $M_T$ for an image depends on the number of blocks having local motion, the magnitude of that local motion and the relative position of the blocks with motion within the image. Further, the global motion $M_G$ may be multiplied by a constant k, as shown in the equation of FIG. 5D, to allow different weights to be given to the global velocity and the average of local velocities. If k is more than one, the global motion is weighted more and if less than one the local motion carries the greater weight. The overall total motion curve of FIG. 5D is similar to the total motion curve of FIG. 5B for a single pixel block, but lower in magnitude because the local motion of most pixel blocks of the image frame of FIG. 4 that are included in the average is zero.

In the example of FIGS. 5A-5D, data for pre-capture images are being acquired in the period before time t1. If the step 79 (FIG. 3) is being implemented, then the motion after acquiring the last pre-capture image at time t1 is estimated from data of the pre-capture images, as shown dashed in FIGS. 5A-5D. The motion detected from the pre-capture images is extrapolated into the future. A period t1-t3 is preferably defined in which the minimum motion is sought to be identified. The total motion (FIG. 5D) is, in this example, the quantity for which minimum motion is sought, and that total motion is zero at time t2. So that at time t2, the effects of motion on the picture being taken are estimated to be minimized, so this instant is selected to capture the image. Of course, actual motion functions can be more complicated than those illustrated in FIGS. 5A-5D, in which case a minimum value of $M_T$ is sought within the time period t1-t3.

As an alternative to making exposure adjustments based on the total motion of the scene relative to the camera image frame, the local motion of only a portion of the scene may be used. For example, the camera may be provided with a fixed or user definable outline, such as a rectangle, that can be positioned to surround a portion of the image for which motion compensation is primarily desired. In the example of FIG. 4, the user could surround image blocks $M_{L(2,3)}$, $M_{L(3,3)}$, $M_{L(3,4)}$, and $M_{L(2,4)}$ with such an outline. This portion of the image could be an object that is moving relative to other portions of the scene, such as a vehicle or a person. The processing then calculates a single local motion quantity, such as an average of the vector magnitudes for these blocks, and this quantity is then used to minimize blurring of such an object within the scene. To accomplish this, the local motion quantity is used in place of the total motion to determine the time to capture the image and/or to adjust the exposure parameters. The local motion of the outlined portion of the scene is thus taken into account while motion of other parts of the scene are not.

Figure 6A:
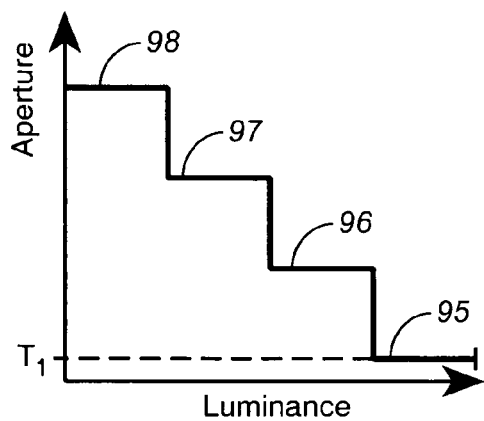
FIGS. 6A-6C show an example of automatic camera exposure parameters as a function of the luminance of the captured image.
Figure 6B:
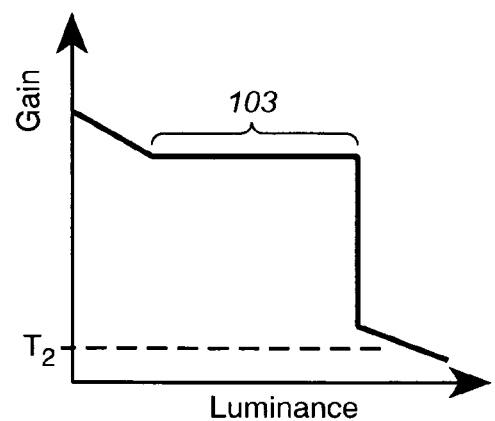
Figure 6C:
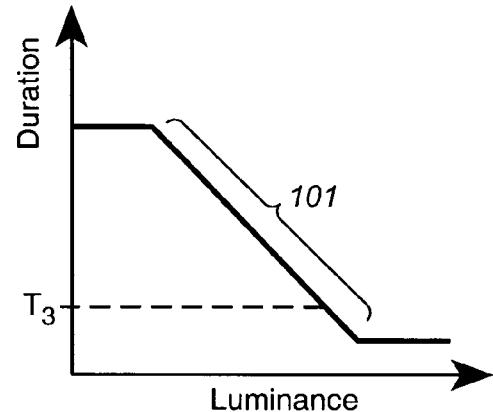

FIGS. 6A, 6B and 6C help to illustrate the automatic exposure calculation 75 (FIG. 3) and the choice that is made in the step 81 based upon these calculations. A digital camera, for example, often has only several discrete levels of aperture opening from which a selection is made to take a picture. Aperture openings 95-98 are shown in FIG. 6A. For each of these levels, there is a gain function such as illustrated in FIG. 6B and an exposure time (duration) function such as illustrated in FIG. 6C. A sloping portion 101 of the exposure duration curve (FIG. 6C) extends between the same luminescent levels as a flat portion 103 of the gain curve (FIG. 6B). The automatic exposure (AE) calculation of preliminary exposure parameters is accomplished by choosing a combination of aperture, gain and duration that provides an average output signal of the photosensor for an image that is within a predetermined range for a wide variety of illumination levels of the scene being photographed. The average luminescence of the image is maintained within boundaries. These calculations, made without benefit of image motion information, balances the desire for a short exposure time in case there is significant image motion against the desires of a deep field of view and low optical blur (small aperture opening) and low noise (low gain). Some level of image motion is necessarily assumed in the calculation of the parameters but no information of any particular image motion is used. It is in the step 85, that these preliminary parameters are adjusted for image motion if such an adjustment will likely improve the quality of the image.

The step 81 (FIG. 3), in this example, initially determines whether the calculated automatic exposure quantities are all below levels T1, T2 and T3 of FIGS. 6A-6C. If so, as previously discussed, there is no need to consider the motion calculations. This is because adjustment of the exposure parameters cannot significantly improve image quality. Since the exposure time is nearly as small as possible, any motion blur cannot be significantly reduced. In addition, there is no prospect of improving the depth of field or noise in the image by increasing the exposure time since a compensating decrease in the aperture opening and gain are not possible; they are already about as low as the camera allows.

Figure 7:
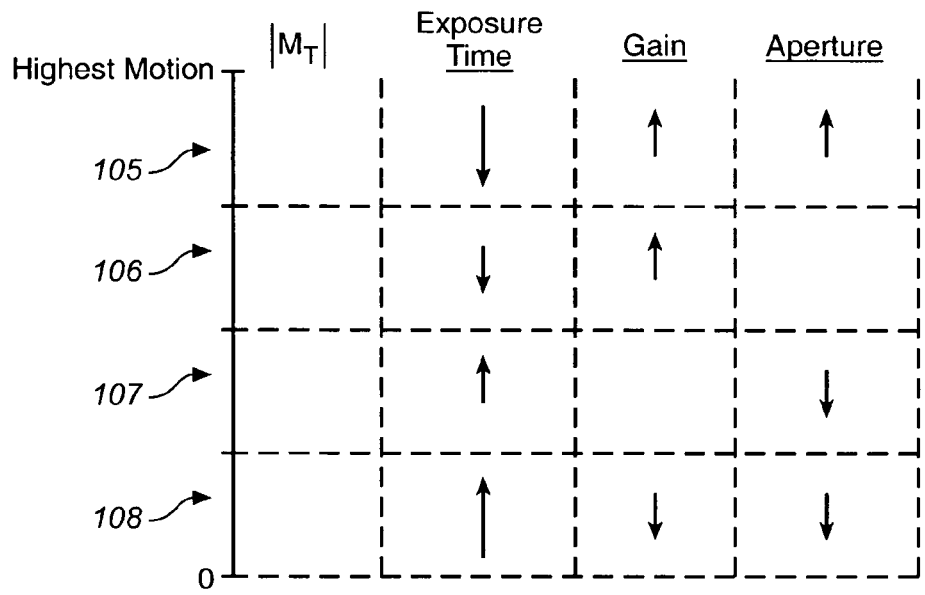
FIG. 7 illustrates a specific example of adjustments of the automatic camera exposure parameters for different levels of motion.

FIG. 7 illustrates an example of step 85 of FIG. 3 for adjusting the preliminary parameters in response to the motion calculations of the step 73. For simplicity, there are four different sets 105-108 of adjustments, depending upon the absolute magnitude of the total motion $M_T$ at the expected time of exposure. For the highest level 105, the exposure time is decreased significantly and one-half the image luminescence lost by that is restored by increasing the gain and the other one-half by increasing the aperture opening. In the next level 106, with lesser motion, the exposure time is reduced by a smaller amount and the lost image luminescence restored by increasing either the gain or the aperture. If there is little or no motion, the level 108, the exposure time may be increased and the extra luminescence is reduced by reducing the gain and the aperture opening, both with beneficial results on the captured image. If there is some small amount of motion, the level 107, the exposure time is increased a smaller amount and either the gain or the aperture opening is reduced to restore the image signal to about the original level of luminescence.

In the examples of gain adjustment given above, the gain level of the analog signal is adjusted before digitizing the signal and this adjusted level is then used during capture of the image. In addition to this, or in place of it, the gain of an image may be adjusted in the digital domain after data of the image have been captured and digitized. For example, the digital gain adjustment can be performed after the data have been captured in the camera's internal memory, as part of image processing or enhancement stage, but before compressing the data and writing it to a removable non-volatile memory. Although digital gain increase usually results in a noisier image than analog gain increase, it may be convenient to control the digital gain as well. The amount of digital gain that is required may be determined during the process that adjusts the exposure parameters in advance of image capture, as part of calculating the exposure time, aperture and perhaps analog gain, but then applied to the digital data of the image after it has already been captured. Alternatively, or in addition, the gain level of the image may be determined and adjusted as part of the post-processing or enhancement of the captured image data and applied thereafter in that stage.

The parameter adjustment example of FIG. 7 shows several motion thresholds between the sets 105-108 of adjustments. For any motion above the threshold between the sets 106 and 107, the parameters are individually adjusted in a single direction, and when the motion is below that threshold, the parameters are adjusted in the opposite direction. As a variation of this single threshold, two motion thresholds can be defined. When the motion is above the higher of the two thresholds, the parameters are individually adjusted in one direction and individually adjusted in the opposite direction when below the lowest threshold. For motion values between the thresholds, no adjustment of the preliminary parameters would be made.

CONCLUSION

Although the various aspects of the present invention have been described with respect to exemplary embodiments thereof, it will be understood that the present invention is entitled to protection within the full scope of the appended claims.

It is claimed:

1. A method of operating an electronic imaging device as a camera, comprising:
   repetitively acquiring data of two or more images of a scene,
   calculating at least one quantity of motion of at least a portion of the scene relative to the camera from the acquired data of said two or more images such that the quantity of relative motion is independent of another quantity of total motion that is determined along each directional vector and which is calculated separately from a vector for acquiring data from at least the portion of the scene, and wherein the separate calculation of each directional vector further provides a velocity and an acceleration of the total motion;
   preliminarily setting, from luminescence information within the data of said two or more images, parameters including a duration for capturing data of a final image of the scene without regard to the at least one quantity of relative motion;
   in response to said at least one quantity of relative motion being below a first threshold, adjusting the preliminarily set parameters by at least increasing the duration of exposure;
   in response to said at least one quantity of relative motion being above a second threshold, adjusting the preliminarily set parameters by decreasing at least the duration of exposure; and
   thereafter capturing data of the final image of the scene by use of the adjusted duration and at least one other adjusted exposure parameter selected from a group comprising aperture size and gain.

2. The method of claim 1, wherein the first and second thresholds are the same.

3. The method of claim 1, wherein preliminarily setting parameters includes setting at least one other exposure parameter, and adjusting the preliminarily set parameters in response to said at least one quantity of relative motion being below a first threshold by additionally decreasing said at least one other exposure parameter, and adjusting the preliminarily set parameters in response to said at least one quantity of relative motion being above a second threshold by additionally increasing said at least one other exposure parameter.

4. The method of claim 3, wherein the first and second thresholds are the same.

5. The method of claim 3, wherein said at least one other exposure parameter includes a size of an aperture through which light of the image passes.

6. The method of claim 3, wherein said at least one other exposure parameter includes image gain.

7. The method of claim 6, wherein the image gain includes a level of gain of an analog signal carrying image information prior to capturing the data.

8. The method of claim 6, wherein capturing the data includes digitizing the captured data and adjusting the image gain includes adjusting a level of gain of the digitized image data.

9. The method of claim 1, wherein said at least one quantity of relative motion includes motion of the camera with respect to each portion of the scene.

10. The method of claim 1, wherein said at least one quantity of relative motion includes motion in the at least one portion of the scene.

11. The method of claim 1, which additionally comprises using said at least one quantity of relative motion to determine a time to capture data of the final image, and thereafter capturing said data of the final image.

12. The method of claim 11, wherein the time to capture data of the final image is determined to include an estimate of a time during a predefined interval when the relative motion is expected to be minimal or less than a predetermined threshold.

13. The method of claim 11, wherein calculating at least one quantity of relative motion includes estimating said at least one quantity at the time determined to capture data of the final image.

14. The method of claim 1, which additionally comprises, after preliminarily setting exposure parameters, determining whether the preliminarily set exposure parameters fall within predefined ranges, and if so, adjusting of the preliminarily set exposure parameters is omitted.

15. The method of claim 1, wherein acquiring data of two or more images of the scene includes acquiring data of two or more successive images having a resolution that is lower than a resolution of the final image.

16. The method of claim 1, wherein calculating at least one quantity of motion includes utilizing motion vectors within said at least a portion of the scene.

17. A processor-readable storage medium that includes data and instructions, wherein the execution of the instructions on an apparatus operating as a camera enables actions, comprising:
   repetitively acquiring data of two or more images of a scene;
   calculating at least one quantity of total motion of at least a portion of the scene relative to the camera from the acquired data of said two or more images such that the quantity of total motion is based, at least in part, on a global motion quantity and a plurality of local motion quantities that are independent of the global motion quantity, wherein the global motion is determined along each directional vector that is calculated separately from a vector for acquiring data from at least the portion of the scene, and wherein the separate calculation of each directional vector further provides a velocity and an acceleration of the global motion;
   preliminarily setting, from luminescence information within the data of said two or more images, parameters including a duration for capturing data of a final image of the scene without regard to the at least one quantity of total motion;

in response to the at least one quantity of total motion being below a first threshold, adjusting the preliminarily set parameters by at least increasing the duration of exposure;

in response to the at least one quantity of total motion being above a second threshold, adjusting the preliminarily set parameters by decreasing at least the duration of exposure; and capturing data of the final image of the scene by use of the adjusted duration and at least one other adjusted exposure parameter selected from a group comprising aperture size and gain.

18. The processor-readable storage medium of claim 17, wherein calculating the at least one quantity of total motion includes combining the global motion quantity with the weighted average of the local motion quantities.

19. The processor-readable storage medium of claim 17, wherein the global motion quantity is associated with motion of the camera with respect to each portion of the scene.

20. An apparatus arranged to operate as a camera, comprising:

a memory for storing instructions; and a processor that is configured to enable actions based on execution of the instructions, including:

repetitively acquiring data of two or more images of a scene;

calculating at least one quantity of total motion of at least a portion of the scene relative to the camera from the acquired data of said two or more images such that the quantity of total motion is based, at least in part, on a global motion quantity and a plurality of local motion quantities that are independent of the global motion quantity, wherein the global motion quantity is determined along each directional vector that is calculated separately from a vector for acquiring data from at least the portion of the scene, and wherein the separate calculation of each directional vector further provides a velocity and an acceleration of the global motion;

preliminarily setting, from luminescence information within the data of said two or more images, parameters including a duration for capturing data of a final image of the scene without regard to the at least one quantity of total notion;

in response to the at least one quantity of total motion being below a first threshold, adjusting the preliminarily set parameters by at least increasing the duration of exposure;

in response to the at least one quantity of total motion being above a second threshold, adjusting the preliminarily set parameters by decreasing at least the duration of exposure; and capturing data of the final image of the scene by use of the adjusted duration and at least one other adjusted exposure parameter selected from a group comprising aperture size and gain.

* * * * *